United States Patent [19]

Sellman et al.

[11] 3,780,578

[45] Dec. 25, 1973

[54] MEASUREMENT OF THE TOTAL VOLUME FLOW OF A WATERCOURSE

[75] Inventors: Paul V. Sellman, Norwich, Vt.; S. Larence Dingman, Hanover; Ronald T. Atkins, West Labanon, both of N.H.

[73] Assignee: The United States of America as represented by the Secretary of the Navy, Washington, D.C.

[22] Filed: May 2, 1972

[21] Appl. No.: 249,600

[52] U.S. Cl. .............................. 73/227, 73/170 A
[51] Int. Cl. .................................... G01f 1/00
[58] Field of Search ................. 73/194 R, 227, 198, 73/229, 170 A

[56] References Cited
UNITED STATES PATENTS
1,200,654  10/1916  Sawyer ............................. 73/194 R FOREIGN PATENTS OR APPLICATIONS
1,045,115  11/1958  Germany ......................... 73/170 A
1,099,772  1/1968  Great Britain ....................... 73/229

OTHER PUBLICATIONS

Messias, "Ultrasonics Measures Flow Velocity of Rivers," Electronics, Oct. 1961, pp. 56–59

Primary Examiner—Charles A. Ruehl
Attorney—Harry M. Saragovitz et al.

[57] ABSTRACT

Measurement of the volume flow of a watercourse is accomplished by bridging the watercourse with a taut line and thereafter causing a floating instrumented package to traverse the watercourse, guided by said line. The instrumented package which contains means to ascertain the depth of the watercourse and separate means to measure the velocity of the watercourse, is remotely controlled from one bank of the watercourse. Data collected at spaced intervals along the path of the taut line is used to calculate total volume flow.

12 Claims, 3 Drawing Figures

PATENTED DEC 25 1973 3,780,578

MEASUREMENT OF THE TOTAL VOLUME FLOW OF A WATERCOURSE

The invention described herein may be manufactured, used and licensed by or for the Government for governmental purposes without the payment to us of any royalty thereon.

BACKGROUND OF THE INVENTION

This invention relates to the measurement of the volume flow of a relatively narrow watercourse such as a river or stream, and, more particularly, to a method of measuring such volume flow whereby all operations involved in obtaining the requisite measurement data can be controlled from one bank of the watercourse.

Measurement of the water flow of a watercourse is normally accomplished by having an individual either wade across or boat across the watercourse while measuring the depth of the water at intervals with depth measuring rods. The average velocity of the water at each location is also determined with conventional current meters. From the depth and velocity measurements, the volume flow at that precise location on the watercourse can be calculated. In certain locations, and on certain rivers or streams, the collection of such measurement data may be extremely difficult or even hazardous. Remote or relatively inaccessible locations may preclude the use of small boats. Swift currents, treacherous bottoms, or deep waters may prevent wading. In some cases, the existence of harmful organisms in the water would discourage small boats or wading procedures. A new, simple, and reliable method is required for measurement of water flow; which method is accurate and avoids the hazards and obstacles described for the prior art, hand-measuring techniques.

SUMMARY OF THE INVENTION

Measurement of total volume flow of a narrow watercourse is accomplished from one bank or shore of the watercourse by means of a remotely controlled floating instrumented package which traverses the watercourse and collects data necessary to calculate total volume flow. This invention makes it unnecessary for an individual to enter into or cross over the watercourse to collect measurement data. The floating instrumented package measures water depths by means of an echo sounding system having a depth resolution of 0.3 inch. Velocity measurements are made by means of a current meter which is adjustable as to depth.

DESCRIPTION OF THE PREFERRED EMBODIMENT

Figure 2:
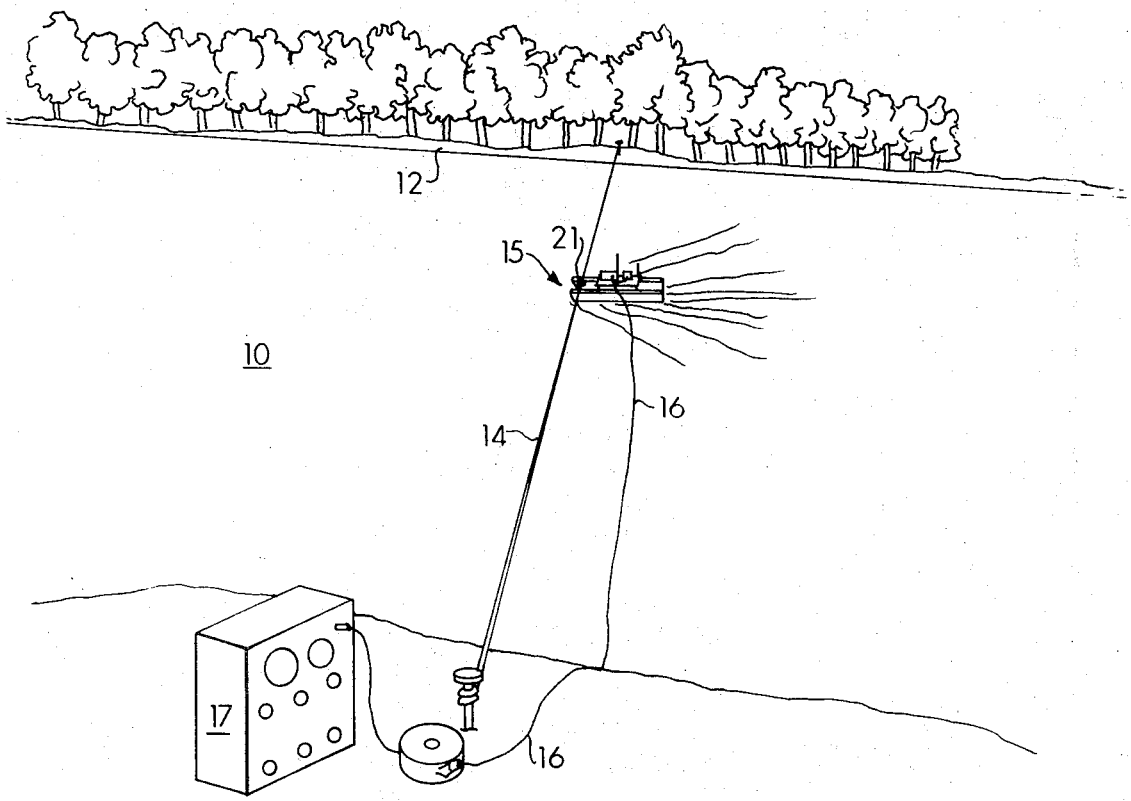
FIG. 2 illustrates the system for collecting measurement data from one bank of a narrow watercourse by means of a floating instrumented package.

Referring to FIG. 2, there is shown the apparatus and technique, according to the present invention, for remotely collecting data necessary to determine volume flow on a narrow watercourse. In the practice of the instant invention, it is necessary to span the watercourse 10 at the desired location with a strong, taut line which extends from a first shore or bank 11 to the opposite or second bank 12. The line 14 is cast from the first bank either by hand or by means of any mechanized or pyrotechnic throwing device. A small grappling hook (not shown) on the cast end of the line becomes engaged on the second bank 12 and allows the line to be tightly drawn across the watercourse and securely fastened to both banks. To simplify the calculations necessary to obtain the volume flow of the watercourse, it is preferred that the line extend in a direction normal to the axis of flow of the watercourse. A floating instrumented package 15 is placed on the watercourse from the first bank 11 and engaged to the line 14. A cable 16 connects the floating package with a console 17 on the shore and is paid out as the package traverses the watercourse. The floating package 15 and measurement instruments located thereon are all controlled from the console via cable 16 and measurement data or results are transmitted to readout devices on the console.

Figure 1:
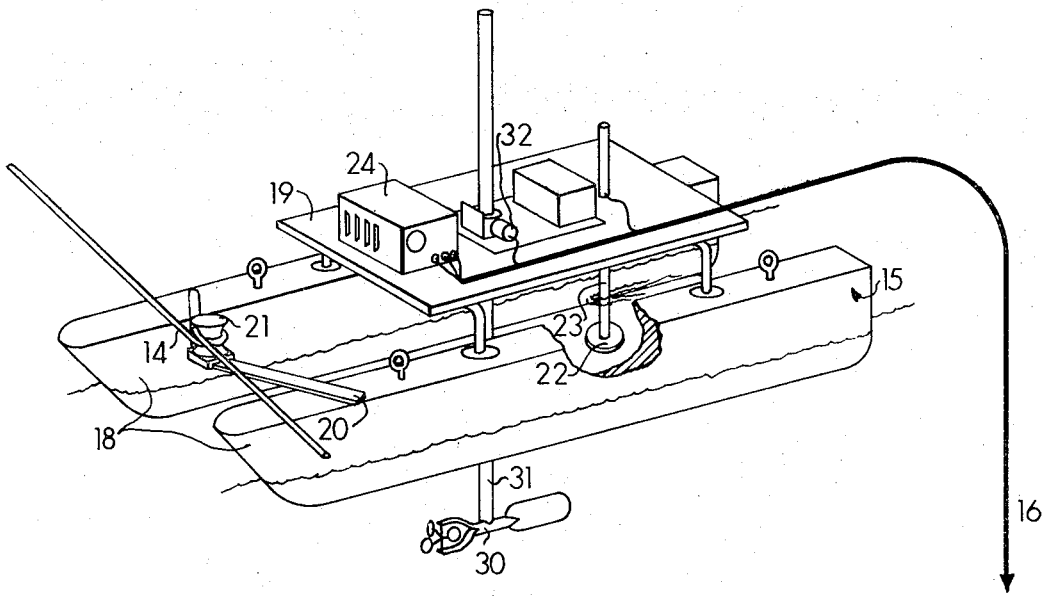
FIG. 1 is a perspective view of the floating instrumented package of this invention.

The floating instrumented package 15, shown in more detail in FIG. 1, consists basically of two spaced-apart, fiber-glass-encased Styrofoam hulls 18 which support a raised platform 19 spanning the hulls. The low center of gravity of the components on said platform and the spaced-apart hulls results in an extreme stable, seaworthy craft. Spanning the hulls forward of the platform is a cross bar 20 which supports and has affixed thereto an electrically powered capstan 21. Line 14 is looped around the capstan before the package is placed on the water. By driving the capstan in forward or reverse, the floating package 15 is moved along the line away from or back towards the first bank 11. Instrumentation on the platform includes a sonar depth sounder coupled to a pulse analyzing circuit. The sonar transponder 22 is located in the water and secured to the platform by a vertical shaft 23. The instrumentation of the sonar system is located at 24. These units are connected by cable 16 to an interval timer and manual control located on the console 17. Depth is determined by triggering a pulse from the sonar transformer which simultaneously starts the interval timer. The first reflected pulse returning to the transponder 22 stops the timer which digitally displays the elapsed time in microseconds. The depth is then read from a nomograph, using 4,800 feet per second as the velocity of sound in water.

In order to obtain the necessary resolution required to measure water depths ranging from 1 to 25 feet, it was necessary that a special system be developed which would utilize an interval timer with one microsecond resolution as the readout device, and design the necessary circuits to control the timer. Since 10 microseconds corresponds to a depth resolution of 0.3 inch (using a velocity of 4,800 feet per second), the system would then have the desired resolution. The transducer used in the system is a barium titantate crystal element mounted in an epoxy resin housing and the resonant frequency of this unit is 200,000 hertz. When connected into the system, the transducer would ring for about 250 microseconds when a step voltage is applied. Control circuitry was designed which would (1) pulse the transducer and start the timer when a "start" switch is pushed, (2) disable the "stop" circuits for at least 250 microseconds, then enable the "stop" circuitry, (3) amplify the returning "echo" from the transducer and use this signal to stop the timer, and (4) remain in a timed out condition until reset is desired. Inhibiting the "stop" amplifier for at least 250 microseconds is necessary since the transducer is permanently connected to the "stop" circuits and therefore the ringing of the transducer during the "start" phase would otherwise shut the timer off. The time delay was finally set at 400 microseconds which corresponds to a depth of 11.5 inches. 400 microseconds was decided upon since it provided the necessary time delay for circuit quieting with a reasonable safety factor; allows for variations in the minimum necessary time delay due to temperature effects, component aging; and still provides the reasonable lower limit for depth measurements of approximately one foot.

Figure 3:
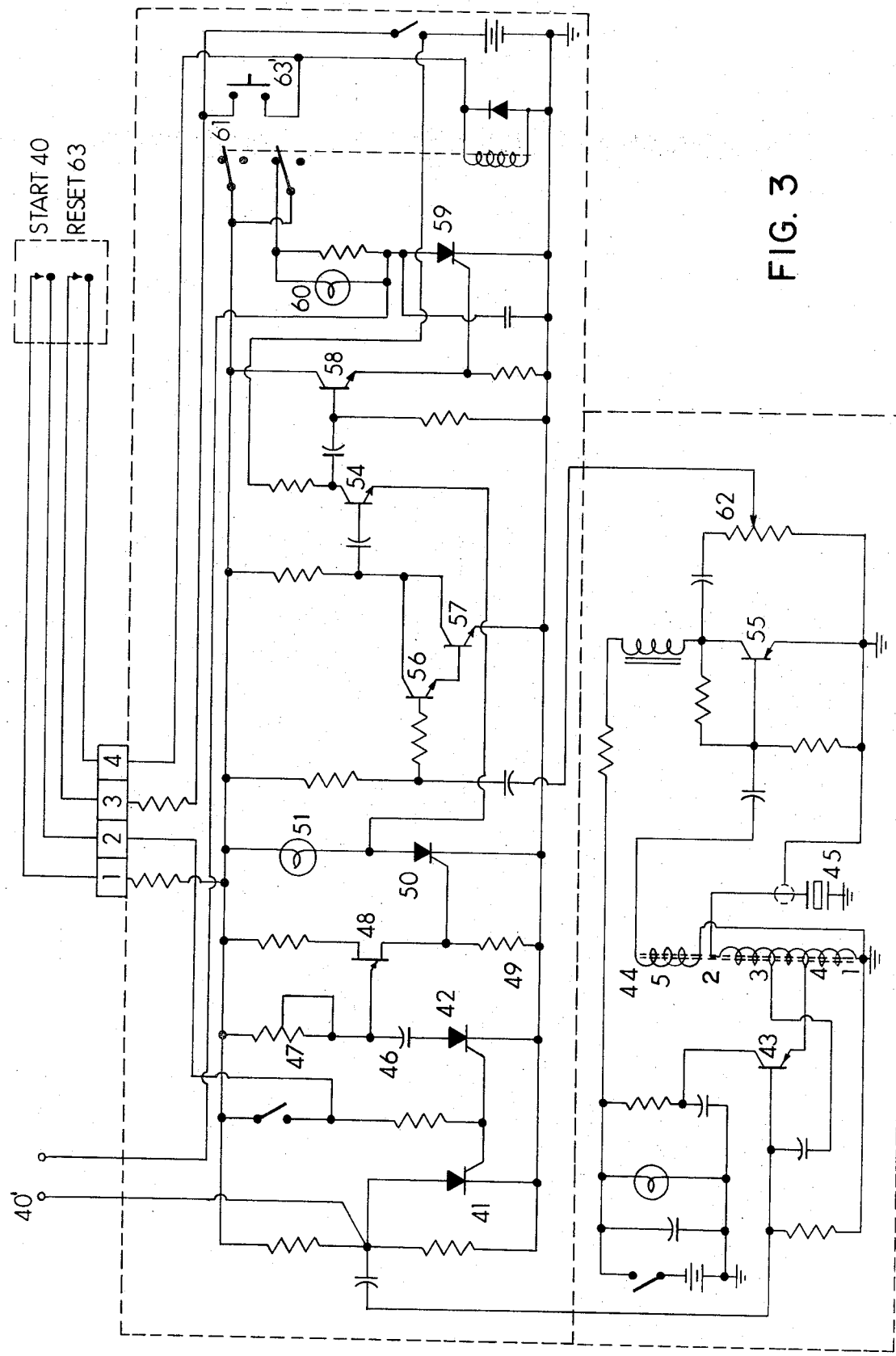
FIG. 3 is a schematic diagram of the electrical circuit of the echo sounding system.

The circuit diagram for the system is shown in FIG. 3. Referring to this diagram, the measurement sequence is initiated by closing the "start" switch 40' on the control box itself or else on the console 40. Closing either of these two start switches trips silicon control rectifier (hereinafter SCR) 41 and 42. When SCR 41 fires, it changes the voltage of its anode from +4.0 to +0.6 volts. This negative going voltage is sent to the timer (which immediately starts timing) and is also coupled to the base transistor 43 through a 0.1 microfarad capacitor. This negative voltage on the base of 43 causes the transistor to turn on so that current flows through the transistor into terminals 4 and 1 of the transformer 44. Transformer action due to the current flow through terminals 4 and 1 of the transformer generates a voltage pulse of approximately 100 volts across the transducer 45, causing it to pulse a compression wave into the water. A portion of this stepped up voltage is also fed back to the base of transistor 43, causing a few cycles of oscillation. These few cycles of oscillation are necessary to insure that the transducer receives sufficient energy. As mentioned previously, this entire action takes about 250 microseconds. With the pulsing of the transducer, the "start" phase of the sequence is completed.

While the "start" pulse generation just described is going on, time delay is also occurring. Like "start" pulse generation, time delay action is initiated at the closing of one of the "start" switches, tripping SCR 42. When SCR 42 fires, it grounds one side of capacitor 46 which then starts to charge through variable resistor 47. 47 and 46 form an RC time delay circuit which controls the unijunction transistor 48. When the voltage across 46 reaches 7 volts, it trips transistor 48. When 48 trips; its interbase resistance halves causing a sudden increase of current flow through resistor 49. The increased current flow through 49 raised the voltage across it. Since the gate of SCR 50 is connected to resistor 49, the increase in voltage across 49 causes SCR 50 to fire. Gating SCR 50 causes two things to happen: (1) reset light 51 turns on giving a visual indication that time delay has functioned correctly and (2) the emitter of transistor 54 is grounded through SCR 50.

Note that transistor 54 is part of the "stop" circuit amplifier. Before SCR 50 is fired, the emitter of 54 is at power supply potential (+12 volts). This positive emitter voltage completely shuts off the transducer so that "ringing" signals from the "start" phase of the sequence cannot pass through the amplifier. However, when SCR 50 fires (at the end of the 400 microseconds time delay); 54's emitter circuit is grounded so that normal amplifier action may take place. With the grounding of 54's emitter, the time delay phase of the sequence is completed.

With "start" action complete and time delay over, no further action occurs until the "echo" returns from the bottom. The returning wave is sensed by the transducer causing it to generate a small voltage at its terminals. This voltage is stepped up by transformer action and is applied to the base of transistor 55, the first stage of the "stop" circuit amplifier. Transistor 55 is RC coupled to the Darlington circuit made up of transistors 56 and 57. The coupling circuit utilizes a variable 2K resistor 62 so that gain control is provided. The returning signal is amplified by the Darlington circuit and then capacitively coupled to 54. Since 54 has been turned on by the time delay circuit, it further amplifies the signal and applies it to the emitter follower 58. At this point, the returning signal is about 4 volts peak-to-peak.

The gate of SCR 59 is connected across the output of the amplifier; emitter follower circuit 58. The returning signal, therefore, triggers SCR 59 causing its anode voltage to go from +7 volts to +0.6 volts. This negative going voltage is applied to the "stop" channel of the timer, shutting it off. When SCR 59 fires, it also turns on reset light 60, indicating that the entire timing sequence has been completed.

All circuits are now locked in their timed-out positions with all SCR's having been fired. The time taken for the sound wave to travel from the surface to the bottom and return is being displayed on the timer and will remain there until the timer's "reset" button is pushed. The control circuit must also be reset before another timing sequence can be initiated. Both the control box and the remote control console have "reset" switches identified as 63 and 63', respectively. Pushing either one of these switches causes relay 61 to operate, thereby removing battery voltage from all the SCR's in the circuit. Operation of relay 61 also causes reset lights 51 and 60 to go out, indicating that all circuits have reset so that another timing sequence may be started. In this system, the timer is powered by an inverter and a 12 volt battery. The system has been found to be accurate with ± 0.5 inch.

Velocity measurements of the water flow are made by means of a conventional current meter 30 mounted on a gear-driven vertical shaft 31. The current meter is a direct reading type which allows velocities to be read instantaneously to 0.1 foot per second on a shore based indicator located on console 17, the signals being transmitted via cable 16. The average velocity in vertical profile is taken at 0.6 of the total depth. The depth at a given point is first determined by the described sonar technique and the current meter shaft 31 is lowered by a small DC planetary gear motor 32 which drives the gear rack (not shown) and is controlled from the shore. Meter depth is read by color coded markings on the shaft 31, and can be set at ± 0.1 foot intervals. The current meter is lowered to a position 0.6 of the depth as previously determined and the current reading obtained.

In operation, the floating package is caused to be moved certain precisely spaced intervals from the shore. The distance travelled is determined by markings on the cable 16 or by markings on the line 14. At the desired point, a depth measurement is taken as described following which the meter is lowered to a position 0.6 of the distance from the surface of the water to the bottom and a current reading taken. The floating package is again moved to a second location and the operation repeated. These steps are continued until measurements are taken across the width of the watercourse. From these measurements, simple calculations will provide the total volume flow of the watercourse as determined along the line of measurement. Watercourse, as that term is used herein, refers to any moving or flowing body of water such as a river or stream. "Narrow" watercourse is one that is less than 200 feet in width which is the present practical limit for the visual detection of the current meter shaft markings.

We claim:

1. A method of determining the volume flow of a narrow watercourse, which comprises in sequence the following steps:
   a. bridging said narrow watercourse at the desired location with a taut line that extends from the first bank thereof to the opposite or second bank,
   b. causing a floating, instrumented package to traverse said narrow watercourse from said first bank to said second bank and back to said first bank, said line controlling the path of traverse of said instrumented package,
   c. determining the depth of the water by sound echo techniques at regular, spaced intervals along the path of said traverse,
   d. determining the average velocity in vertical profile of the watercourse at each of said regular, spaced intervals, and,
   e. calculating from the velocity and depth measurements the volume flow of the watercourse.

2. A method according to claim 1 wherein the traverse of said instrumented package, the initiation of the water depth measurement, and the water flow velocity measurement are all remotely controlled from said first bank.

3. A method according to claim 2 wherein the traverse of said instrumented package is effected by means of an electrically powered drive motor on said package.

4. A method according to claim 3 wherein the signals controlling said drive motor, and said water depth and water flow velocity measurements are transmitted by an electrical cable connecting said package to said first bank.

5. A method according to claim 4 wherein the data generated by the tests is transmitted to the first bank by said cable.

6. A method according to claim 5 wherein each of the steps involved in obtaining the volume flow data is accomplished from said first bank.

7. A method according to claim 6 wherein said line is cast from said first bank to the opposite bank and a hook means attached to the free end is caused to become attached to said second bank.

8. A method according to claim 7 wherein an electrically powered capstan on said floating instrumented package, attached to said line causes said package to traverse said watercourse.

9. A method according to claim 8 wherein said current meter is mounted on a gear driven vertical shaft which is controllable to position the meter at the desired depth in the water.

10. A method according to claim 9 wherein said current meter readings are taken at 0.6 of the depth of the water.

11. A method according to claim 10 wherein the depth measurement system utilizes an interval timer with a one microsecond resolution as the readout device.

12. A method according to claim 11 wherein said line is normal to the axis of flow of said watercourse.

* * * * *

UNITED STATES PATENT OFFICE
CERTIFICATE OF CORRECTION

Patent No. 3,780,578          Dated December 25, 1973

Inventor(s) Paul V. Sellman, S. Lawrence Dingman and Ronald T. Atkins

It is certified that error appears in the above-identified patent and that said Letters Patent are hereby corrected as shown below:

On the front page of the patent, in connection with data element 75, correct the spelling of "Larence" to read "Lawrence"; and in connection with data item 73 correct the designation of the assignee to eliminate "Secretary of the Navy" and insert "Secretary of the Army."

Signed and sealed this 30th day of April 1974.

(SEAL)
Attest:

EDWARD M. FLETCHER, JR.
Attesting Officer

C. MARSHALL DANN
Commissioner of Patents